(12) United States Patent
Bachenko et al.

(10) Patent No.: US 7,853,445 B2
(45) Date of Patent: Dec. 14, 2010

(54) METHOD AND SYSTEM FOR THE AUTOMATIC RECOGNITION OF DECEPTIVE LANGUAGE

(75) Inventors: Joan C. Bachenko, Oxford, NJ (US); Michael J. Schonwetter, Minneapolis, MN (US)

(73) Assignee: Deception Discovery Technologies LLC, Minneapolis, MN (US)

( * ) Notice: Subject to any disclaimer, the term of this patent is extended or adjusted under 35 U.S.C. 154(b) by 1171 days.

(21) Appl. No.: 11/297,803

(22) Filed: Dec. 8, 2005

(65) Prior Publication Data

US 2007/0010993 A1 Jan. 11, 2007

Related U.S. Application Data

(60) Provisional application No. 60/635,306, filed on Dec. 10, 2004.

(51) Int. Cl.
*G06F 17/20* (2006.01)
*G06F 17/27* (2006.01)

(52) U.S. Cl. ............................ 704/9; 704/1
(58) Field of Classification Search ............... 704/1–10
See application file for complete search history.

(56) References Cited

U.S. PATENT DOCUMENTS 5,438,511 A 8/1995 Maxwell, III et al.

(Continued)

OTHER PUBLICATIONS

Bachenko et al. "Verification and Implementation of Language-based Deception Indicators in Civil and Criminal Narratives," Proceedings of the 22$^{nd}$ International Conference on Computational Linguistics, Manchester, United Kingdom, pp. 41-48 (Aug. 2008). (XP002536462).

"SCAN: Deception Detection by Scientific Content Analysis" by Tony Lesce, reprinted with permission from 'Law and Order'. vol. 38, No. 8, Aug. 1990.

"Basis Technology and TEMIS join to deliver multilingual text mining solutions", Press Release, 2005.

(Continued)

*Primary Examiner*—James S Wozniak
*Assistant Examiner*—Matthew H Baker
(74) *Attorney, Agent, or Firm*—Dorsey & Whitney LLP

(57) ABSTRACT

A system for identifying deception within a text includes a processor for receiving and processing a text file. The processor includes a deception indicator tag analyzer for inserting into the text file at least one deception indicator tag that identifies a potentially deceptive word or phrase within the text file, and an interpreter for interpreting the at least one deception indicator tag to determine a distribution of potentially deceptive word or phrases within the text file and generating deception likelihood data based upon the density or distribution of potentially deceptive word or phrases within the text file. A method for identifying deception within a text includes the steps of receiving a first text to be analyzed, normalizing the first text to produce a normalized text, inserting into the normalized text at least one part-of-speech tag that identifies a part of speech of a word associated with the part-of-speech tag, inserting into the normalized text at least one syntactic label that identifies a linguistic construction of one or more words associated with the syntactic label, inserting into the normalized text at least one deception indicator tag that identifies a potentially deceptive word or phrase within the normalized text, interpreting the at least one deception indicator tag to determine a distribution of potentially deceptive word or phrases within the normalized text, and generating deception likelihood data based upon the density or frequency of distribution of potentially deceptive word or phrases within the normalized text.

22 Claims, 4 Drawing Sheets

U.S. PATENT DOCUMENTS

| | | | |
|---|---|---|---|
| 6,721,734 B1* | 4/2004 | Subasic et al. | 707/5 |
| 6,963,830 B1* | 11/2005 | Nakao | 704/1 |
| 7,020,607 B2 | 3/2006 | Adachi | |
| 7,058,566 B2 | 6/2006 | Shaw | |
| 7,260,519 B2* | 8/2007 | Polanyi et al. | 704/9 |
| 7,356,463 B1* | 4/2008 | Isabelle | 704/9 |
| 7,369,985 B2* | 5/2008 | Polanyi et al. | 704/8 |
| 7,386,442 B2* | 6/2008 | Dehlinger et al. | 704/10 |
| 7,424,420 B2* | 9/2008 | Polanyi et al. | 704/8 |
| 7,689,410 B2* | 3/2010 | Chang et al. | 704/9 |
| 2003/0212546 A1 | 11/2003 | Shaw | |

OTHER PUBLICATIONS

"A Maximum Entropy Approach to Identifying Sentence Boundaries", by Jeffrey C. Reynar and Adwait Ratnaparkhi, Department of Computer and Information Science, University of Pennsylvania, pp. 16-19, Apr. 3, 1997.

A Stochastic Parts Program and Noun Phrase Parser for Unrestricted Text, *Proceedings of the 2nd Conference on Applied Natural Language Processing* (ANLP '88), Garside, R., G. Leech and A. McEnery, 1988, pp. 136-143.

"Deceptive Communication", by Gerald Miller and James B. Stiff, Sage Publications, 1993, pp. 50-67; pp. 102-117.

"Detecting Lies and Deceit", by Aldert Vrij, 2000, pp. 103-155, pp. 209-225.

"The Language of Confession, Interrogation, and Deception", by Roger W. Shuy, Sage Publications, pp. 74-79, 1998.

"Automating Linguistics-Based Cues for Detecting Deception in Text-based Asynchronous Computer-Mediated Communication", by Lina Zhou, *Group Decision and Negotiation*, vol. 13, pp. 81-106, 2004.

"The Detection of Deception in Forensic Contexts", edited by Par Anders Granhag and Leif A. Stromwall, Cambridge University Press, pp. 41-66, 2004.

"The Language of Deceit: An Investigation of the Verbal Clues to Deception in the Interrogation Context", by Stephen Porter and John C. Yuille, *Law and Human Behaviour*, vol. 20, No. 4, 1996, pp. 443-458.

"Reality Monitoring", by Marcia K. Johnson and Carol L. Raye, *Physchological Review*, 1981, vol. 88, No. 1, pp. 67-85.

"Investigation and Evaluation of Voice Stress Analysis Technology", by Darren Haddad et al., Mar. 20, 2002, *U.S. National Department of Justice*.

"Building a Large Annotated Corpus of English: The Penn Treebank", by Mitchell P. Marcus, Beatrice Santorini and Mary Ann Marcinkiewicz, 1993, *Association for Computational Linguistics*, pp. 313-330.

"Periods, Capitalized Words, Etc.", by Andrei Mikheev, 1994, *Association for Computational Linguistics*, pp. 1-32, vol. 16, No. 1.

* cited by examiner

FIG. 2 FLOWCHART

FIG. 3

*I went to bed at approx. 9:00 to 9:30 P.M. Today I did not have any beers to drink. We were back out hunting by around 2:00 P.M.*

*DI Breakpoint code:*

*word* = *Level 1*

*word* = *Level 2*

*word* = *Level 3*

*word* = *Level 4*

*word* = *Level 5*

*Total Text DI average density= nn.nn*

300

*I went to bed at approx.[HDG] 9:00 to 9:30 P.M. Today I did not have any beers to drink. We [NPC] were back out hunting by around [HDG] 2:00 P.M.*

*DI Breakpoint code:*

*word = Level 1*

*word = Level 2*

*word = Level 3*

*word = Level 4*

*word = Level 5*

*Total Text DI average density= nn.nn*

400

METHOD AND SYSTEM FOR THE AUTOMATIC RECOGNITION OF DECEPTIVE LANGUAGE

CROSS-REFERENCE TO RELATED APPLICATION

This application claims priority from a U.S. provisional patent application Ser. No. 60/635,306, filed on Dec. 10, 2004, which is herein incorporated by reference in its entirety.

BACKGROUND OF THE INVENTION

This invention relates to the application of Natural Language Processing (NLP) to the detection of deception in written texts.

The critical assumption of all deception detection methods is that people who deceive undergo measurable changes—either physiological or behavioral. Language-based deception detection methods focus on behavioral factors. They have typically been investigated by research psychologists and law enforcement professionals working in an area described as "statement analysis" or "forensic statement analysis". The development of statement analysis techniques has taken place with little or no input from established language and speech technology communities.

The goal of these efforts has been twofold. Research projects, primarily conducted by experimental psychologists and management information systems groups, investigate the performance of human subjects in detecting deception in spoken and written accounts of a made up incident. Commercial and government (law enforcement) efforts are aimed at providing a technique that can be used to evaluate written and spoken statements by people suspected of involvement in a crime. In both cases, investigators look at a mix of factors, e.g. factual content, emotional state of the subject, pronoun use, extent of descriptive detail, coherence. Only some of these are linguistic. To date, the linguistic analysis of these approaches depends on overly simple language description and lacks sufficient formal detail to be automated—application of the proposed techniques depends largely on human judgment as to whether a particular linguistic feature is present or not. Moreover none of the proposed approaches bases its claims on examination of large text or speech corpora.

Two tests for measuring physiological changes are commercially available—polygraphs and computer voice stress analysis. Polygraph technology is the best established and most widely used. In most cases, the polygraph is used to measure hand sweating, blood pressure and respiratory rate in response to Yes/No questions posed by a polygraph expert. The technology is not appropriate for freely generated speech. Fluctuations in response are associated with emotional discomfort that may be caused by telling a lie. Polygraph testing is widely used in national security and law enforcement agencies but barred from many applications in the United States, including court evidence and pre-employment screening. Computer voice stress analysis (CVSA) measures fundamental frequency (FO) and amplitude values. It does not rely on Yes/No questions but can be used for the analysis of any utterance. The technology has been commercialized and several PC-based products are available. Two of the better known CVSA devices are the Diogenes Group's "Lantern" system and the Trustech "Vericator". CVSA devices have been adopted by some law enforcement agencies in an effort to use a technology that is less costly than polygraphs as well as having fewer detractors. Nonetheless, these devices do not seem to perform as well as polygraphs.

The article *Investigation and Evaluation of Voice Stress Analysis Technology* (D. Haddad, S. Walter, R. Ratley and M. Smith, National Institute of Justice Final Report, Doc. #193832 (2002)) provides an evaluation of the two CVSA systems described above. The study cautions that even a slight degradation in recording quality can affect performance adversely. The experimental evidence presented indicates that the two CVSA products can successfully detect and measure stress but it is unclear as to whether the stress is related to deception. Hence their reliability for deception detection is still unproven.

Current commercial systems for detection of deceptive language require an individual to undergo extensive specialized training. They require special audio equipment and their application is labor-intensive. Automated systems that can identify and interpret deception cues are not commercially available.

BRIEF SUMMARY OF THE INVENTION

Motivated by the need for a testable and reliable method of identifying deceptive language, the present method detects deception by computer analysis of freely generated text. The method accepts transcribed or written statements and produces an analysis in which portions of the text are marked as highly likely to be deceptive or highly likely to be truthful. It provides for an automated system that can be used without special training or knowledge of linguistics.

A system for identifying deception within a text according to the present invention includes a processor for receiving and processing a text file, wherein the processor has a deception indicator tag analyzer for inserting into the text file deception indicator tags that identify potentially deceptive words and/or phrases within the text file. The processor also includes an interpreter for interpreting the deception indicator tags to determine a distribution of potentially deceptive word or phrases within the text file. The interpreter also generates deception likelihood data based upon the distribution of potentially deceptive word or phrases within the text file. The system may further include a display for displaying the deception likelihood data. The processor may further include a receiver for receiving a first text to be analyzed, a component for normalizing the first text to produce a normalized text, a component for inserting into the normalized text part-of-speech tags that identify parts of speech of word associated with the part-of-speech tags, and a component for inserting into the normalized text syntactic labels that identify linguistic constructions of one or more words associated with each syntactic label. The normalized text including the part-of-speech tag(s) and the syntactic label(s) is provided to the deception indicator tag analyzer.

In one embodiment of the system according to the present invention, the deception indicator tag analyzer inserts the deception indicator tag into the normalized text based upon words or phrases in the normalized text, part-of-speech tags inserted into the normalized text, and syntactic labels inserted in the normalized text. The deception indicator tags may be associated with a defined word or phrase or associated with a defined word or phrase when used in a defined linguistic context. Also, the interpreter may calculate a proximity metric for each word or phrase in the text file based upon the proximity of the word or phrase to a deception indicator tag such that the proximity metric is used to generate the deception likelihood data. The interpreter may also calculate a moving average metric for each word or phrase in the text file based upon the proximity metric of the word or phrase such that the moving average metric is used to generate the deception likelihood data. The calculation of the moving average metric for each word or phrase in the text file may be adjusted by a user of the system to alter the deception likelihood data as desired by the user.

A method for identifying deception within a text in accordance with the present invention includes the steps of: receiving a first text to be analyzed; normalizing the first text to produce a normalized text; inserting into the normalized text at least one part-of-speech tag that identifies a part of speech of the word associated with each part-of-speech tag; inserting into the normalized text at least one syntactic label that identifies a linguistic construction of one or more words associated with the syntactic label; inserting into the normalized text at least one deception indicator tag that identifies a potentially deceptive word or phrase within the normalized text; interpreting the at least one deception indicator tag to determine a distribution of potentially deceptive word or phrases within the normalized text; and generating deception likelihood data based upon the distribution of potentially deceptive words or phrases within the normalized text.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3 is a diagram showing how text is marked for display after analysis for deception.

DETAILED DESCRIPTION

I. Overview

A core notion of the method is that deceptive statements incorporate linguistic attributes that are different from those of non-deceptive statements. It is possible to represent these attributes formally as a method of linguistic analysis that can be verified by empirical tests.

The method begins with certain widely accepted techniques of corpus linguistics and automated text analysis. The deception detection component is based on a corpus of "real world" texts, for example, statements and depositions from court proceedings and law enforcement sources which contain propositions that can be verified by external evidence. Linguistic analysis is accomplished by a combination of statistical methods and formal linguistic rules. A novel user interface interprets results of the analysis in a fashion that can be understood by a user with no specialized training.

A method in accordance with the present invention is implemented as an automated system that incorporates the linguistic analysis along with a method of interpreting the analysis for the benefit of a system user. A typical system user may be a lawyer, a law-enforcement professional, an intelligence analyst or any other person who wishes to determine whether a statement, deposition or document is deceptive.

Unlike polygraph tests and similar devices that measure physiological responses to Yes/No questions, the method applies to freely generated text and does not require specialized or intrusive equipment. Thus it can be used in a variety of situations where statements of several sentences are produced.

The system builds on formal descriptions developed for linguistic theory and on techniques for automated text analysis developed by computational linguists. The analysis advances the state of the art in natural language processing, because deception detection is a novel application of NLP. In addition the system compensates for the inability of humans to recognize deceptive language at a rate little better than chance.

Deception detection in the system is performed by two interacting software systems: (1) a Tagger assigns linguistic deception indicators to words and phrases in a text, (2) an Interpreter identifies patterns of deception indicators that are meaningful to a human user of the system.

Figure 1:
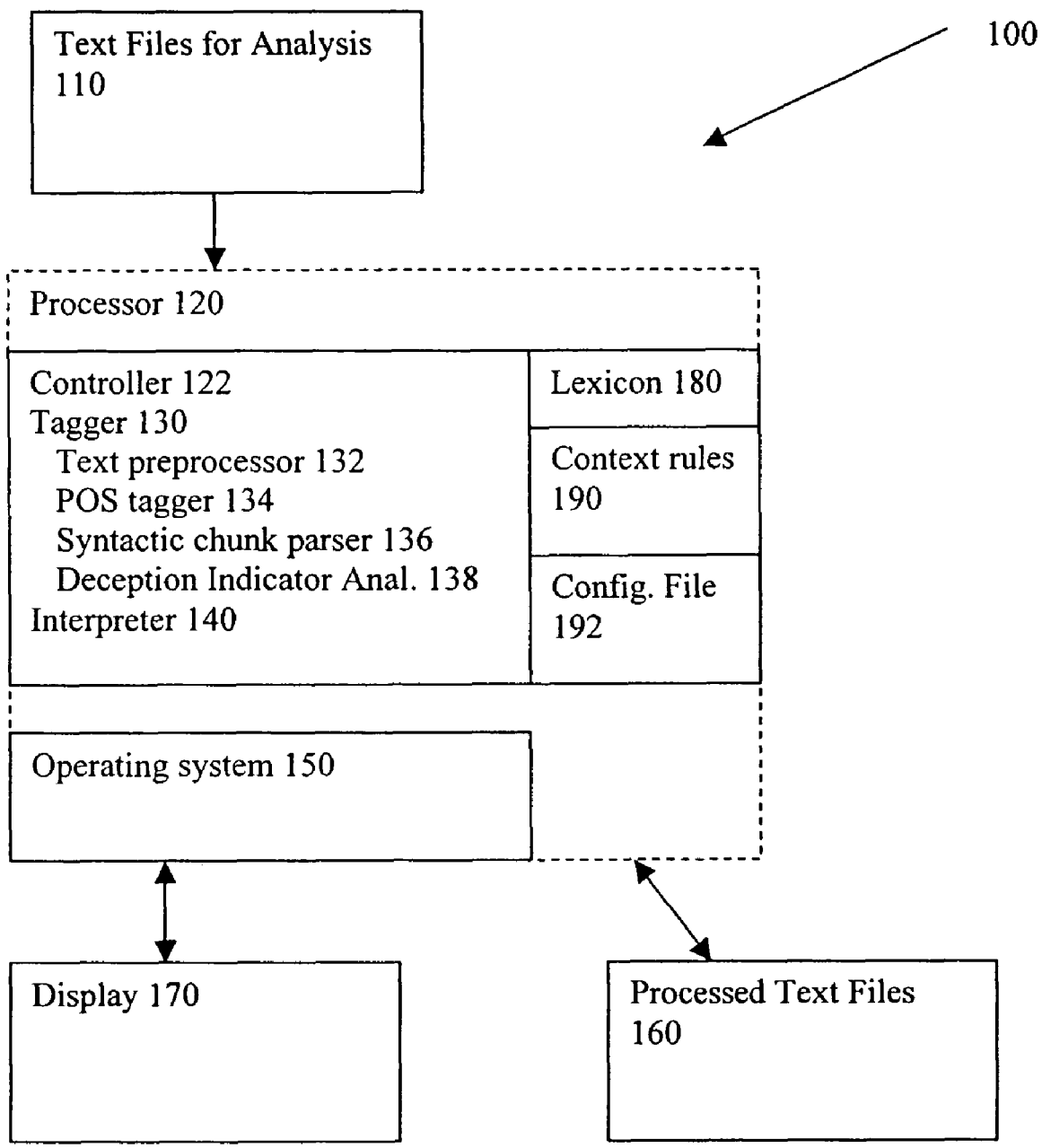
FIG. 1 is a schematic diagram of the components of a system for one embodiment of the invention.

FIG. 1 provides a diagram of a system for automatic detection of deceptive language in accordance with the present invention. As seen in FIG. 1, showing a system overview, the system 100 receives and stores for processing at memory 110 text files for deception analysis. Text files may be received in a pre-stored format or from a live feed, for example, a text feed created by a stenographer or court reporter who creates written text of a live conversation in real time. A user may also select portions of one or more text files for analysis, for example, by limiting the analysis to the answer portions of a question-and-answer transcript, limiting the analysis to certain fields of text within the text file, or otherwise selectively identifying the portions of the text files to be analyzed.

The received files containing the text to be analyzed are sent to a processor 120 that uses a Tagger module 130 and an Interpreter module 140 operating under the control of a Controller module 122. The processor also uses an operating system 150, as well as input and output devices and other conventional functional features (not shown) of a data processing system. The Tagger module 130 and an Interpreter module 140 may be implemented in software components in a variety of languages and stored in memory for executing on processor 120. The various files developed as processing in the Tagger module 130 and an Interpreter module 140 proceeds are shown as processed text files 160. The marked, processed text is stored in data structures generated by the processing steps of the various components and modules. Memory for storing data and executable software may be any suitable form of non-transitory storage medium for use with processor 120. Once a text has been analyzed and an interpretation developed to mark likely deceptive language, the marked text and associated summary or statistical measures from analysis are presented on a display 170. Printed copy is also a possible form of output.

II. The Tagger: Assigning Linguistic Indicators of Deception.

A Tagger 130 for use in the system according to the present invention incorporates several components: a text preprocessor 132, a POS tagger 134, a syntactic chunk parser 136, and a deception indicator (DI) Analyzer 138.

The input to Tagger 130 consists of a written text from memory 110. The text may comprise a transcript of one or more verbal sequences spoken by a subject. It may also comprise a text version of a written statement prepared by a subject. These texts are comprised of statements, sometimes called utterances, which more clearly connotes that the words come from particular speaker or writer whose credibility is being weighed for the words included in the text.

While it is currently believed that transcripts of verbal statements are most likely to exhibit the oral behavior that permits deception to be recognized, material first generated in written form may also be examined. E-mail, letters or other more spontaneous textual material may also be usefully analyzed. For a specialized form of communication, such as e-mail, the parameters of the DI Analyzer 138 may need to be adjusted, based on analysis of a corpus of such communications, where compressed expression or other deviations characteristic of the communication form need consideration.

The Tagger 130 output, which goes to the Interpreter 140, is a text that has been marked for deception indicators. The general process flow is described below with reference to FIG. 2.

A. Text Preprocessor

A preprocessor 132 for use in the system according to the present invention maps written expressions such as punctuation and abbreviations into a consistent unambiguous form. It does this using a set of statements for identifying written conventions such as end-of-sentence punctuation and converting the written symbols into a standard form. The result of preprocessing is called a normalized text. Exemplary preprocessors that may be used in the system according to the present invention include those described in Mikheev, A. (2002), "Periods, capitalized words, etc.", *Computational Linguistics,* 28(3), 289-318; Grefenstette, G. & Tapanainen, P. (1994), "What is a word, what is a sentence? Problems of tokenization," in *Proceedings of 3rd Conference on Computational Lexicography and Text Research* (COMPLEX'94); Palmer, D. and Hearst, M. (1994), "Adaptive multilingual sentence boundary disambiguation," *Computational Linguistics,* 23(2), 241-269; Reynar, J. and Ratnapukhi, A. (1997), "A maximum entropy approach to identifying sentence boundaries," in *Proceedings of the 5th ACL Conference on Applied Natural Language Processing* (ANLP '97).

Normalized, or preprocessed, texts allow other text analysis software, such as part of speech taggers to produce reliable and useful results. In the system in accordance with the present invention, the preprocessor:

(i) Segments the text into sentences. In most cases, the presence of a period, exclamation point or question mark signals the end of a sentence. However, a period may also denote an abbreviation or decimal; if this happens then the period can mark the end of a sentence only if the abbreviation or decimal is the last word of the sentence. The preprocessor uses disambiguation rules to identify which periods are end of sentence markers and mark them as such. The result is segmentation into sentence-sized units of text.

(ii) Identifies abbreviations. Most abbreviations (e.g., etc., Dr.) use a period. Some, such as w/o, use other punctuation. The preprocessor uses an abbreviation decoder to flag abbreviations and to disambiguate ambiguous abbreviations (e.g. St. as Saint or Street). Time and other numerical expressions are treated as abbreviations.

(iii) Maps spelling errors and spelling variants onto a single, correctly spelled form.

Example

Input text:
I went to bed at approx. 9:00 to 9:30 P.M Today I did not have any beers to drink. We were back out hunting by around 2:00 P.M.

Normalized text:
I went to bed at approximately 9 to 9 30 PM. today I did not have any beers to drink we were back out hunting by around 2 PM.

B. Part of Speech Tagger

A part of speech (POS) tagger 134 for use in the system according to the present invention assigns a part of speech (noun, verb, adjective, etc.) to each word in the normalized text. Because most words in English belong to more than one part of speech, the main job of POS tagger 134 is to disambiguate each word in context, assigning one and only one part of speech. For example, the POS tagger 134 will analyze the ambiguous word attempt as either a noun or verb, depending on its context: it is a Noun in make an attempt and a Verb in I will attempt. A POS tagger 134 uses linguistic rules, corpus-based statistical techniques or a combination of both to create a POS-marked output file.

Example

Input text: I went to bed at approximately 9 to 9 30 PM. today I did not have any beers to drink we were back out hunting by around 2 PM.

Output text: I/PRP went/VBD to/TO bed/NN at/IN approximately/RB 9/CD to/TO 9/CD 30/CD PM/NNP ./. today/NN I/PRP did/VBD not/RB have/VB any/DT beers/NNS to/TO drink/VB ./. we/PRP were/VBD back/RB out/RP hunting/VBG by/IN around/IN 2/CD PM/NNP./.

Exemplary POS taggers that may be used in the system according to the present invention include those described in Brill, E. (1994), "Transformation-based error-driven learning and natural language processing: A case study in part-of-speech tagging," *Computational Linguistics,* (21)4, 543-566; Church, K. (1988), "A stochastic parts program and noun phrase parser for unrestricted text," in *Proceedings of the 2nd Conference on Applied Natural Language Processing* (ANLP '88); Garside, R., Leech, G. and McEnery, A. (1997) *Corpus Annotation,* Longman, London and New York; Voutilainen, A. (1995) "Morphological disambiguation," in Karlsson, F., Voutillainen, A., Heikkila, J. and Anttila, A. (Eds.) *Constraint Grammar: A Language-Independent System for Parsing Unrestricted Text,* pp. 165-284. Mouton de Gruyter, Berlin.

C. Syntactic Chunk Parser

A syntactic chunk parser 136 for use in the system according to the present invention builds a syntactic structure for some of the phrases in the to-be-analyzed text in memory 110 and marks certain relationships among the phrases. The parser is, for example, a chunk parser that does not attempt to build a complete structure for the entire sentence, but only builds structure for parts of the sentence (word chunks). A chunk parser uses syntactic rules to build only as much structure as is needed for subsequent processing. Exemplary parsers that may be used in the system according to the present invention include those offered by Connexor (the Machinese Phrase Tagger), The Temis Group (the XeLDA parser, which was originally developed by Xerox) and Infogistics (the NL Processor, which is based on the LT chunk parser developed at the University of Edinburgh, Language Technology Group).

The parser 136 builds partial structures for the following linguistic constructions: noun phrases (NP); sentential complements for a subset of verbs (e.g., think in "think that the car went north"); numerical and time expressions; causal expressions (e.g., in order to, because). The parser also identifies the subject NP and main verb of a sentence (the verb think of the previous example is the main verb of the sentence, while went is an embedded verb). In the following description, the labeled structures output by the chunk parser are referred to as word chunks, although in some cases the word chunks may be single words, rather than phrases.

Example

Input:
I/PRP went/VBD to/TO bed/NN at/IN approximately/RB 9/CD to/TO 9/CD 30/CD PM/NNP ./. today/NN I/PRP did/VBD not/RB have/VB any/DT beers/NNS to/TO drink/VB ./. we/PRP were/VBD back/RB out/RP hunting/VBG by/IN around/IN 2/CD PM/NNP ./.

Output:
[I/PRP]NP_SUBJ [went/VBD]MAINVERB to/TO [bed/NN]NP at/IN approximately/RB 9/CD to/TO 9/CD 30/CD [PM/NNP]NP ./. [today/NN]NP [I/PRP]NP_SUBJ [did/VBD not/RB have/VB]MAINVERB [any/DT beers/NNS]NP to/TO drink/VB ./. [we/PRP]NP_SUBJ [were/VBD]MAINVERB back/RB out/RP hunting/VBG by/IN around/IN 2/CD [PM/NNP]NP ./.

In the above, the POS abbreviations are those used by the UPenn Treebank, e.g., VBD=Verb, past tense; NN=Noun, singular; PRP=Personal Pronoun; DT=Determiner; IN=Preposition. See Marcus, M. P., Santorini, B., and Marcinkiewicz, M. A. (1993) "Building a large annotated corpus of English: The Penn Treebank." *Computational Linguistics*, 19(2), 313-330.

III. Deception Indicator Analyzer

A deception indicator ("DI") analyzer 138 for use in the system according to the present invention is based on an approach to deception detection called "statement analysis". Several linguistic features used by the analyzer are derived from the literature on statement analysis. One feature making the analyzer 138 effective is its use of specific linguistic formalism to identify and interpret deception indicators. Other approaches to statement analysis use indicators that cannot be formalized or automated (in current technologies) and rely on the intuitions of a human analyst. These approaches rely on language descriptions that are simple and incomplete. For example, approaches that attempt to include formal linguistic features look for words and word classes but do not consider syntactic and semantic structure.

The DI analyzer 138 receives from syntactic chunk parser 136 a text that has been marked for part of speech and syntactic characteristics. Analyzer 138 identifies deception cues and inserts the deception indicator tags—deception indicator ("DI") tags. A DI tag is a label assigned to or associated with one or more words or phrases (word chunks). Some DI tags may be associated with complex syntactic structures, e.g., the verb-complement constructions started to go and needed to leave, while others are associated with word strings that are labeled according to three criteria: (1) the DI tag may be associated with a simple word or phrase such as probably, never, I swear to God; (2) the DI tag may be assigned depending on linguistic context of the word or phrase; for example, around receives a DI tag when it precedes a time expression (I went for a walk around 6) but not when it precedes a concrete noun (I went for a walk around the block); or (3) the DI tag may be associated with a simple phrase that can contain optional material, so I don't recall may optionally contain an adverb as in I really don't recall.

To assign a DI tag to word chunks within a text analyzed, the DI analyzer uses a lexicon that lists words and phrases associated with deceptive language and a set of rules that use part of speech and syntactic structure to determine tags for words and phrases that are ambiguous as to whether they have deceptive and non-deceptive uses or that include optional embedded material.

A. List of DI Tags

In accordance with one embodiment of the present invention, the DI tags used by the system are designed based upon three approaches to the detection of truth and deception in verbal statements: (1) Statement Validity Analysis uses criteria-based content analysis to verify the truth of a statement. It was developed in Germany for use in child abuse investigations (Steller, M. and Koehnken, G. (1989), "Criteria-based statement analysis," in Raskin, D. C. (Ed.) *Psychological Methods in Criminal Investigation and Evidence*, pp. 217-245. Springer, N.Y.). (2) Reality Monitoring is a theory of memory of real vs. imagined events. It asserts that reports of true memories will differ from reports of created memories in a number of ways, for example, true memories will have a greater degree of sensory information than created memories (Johnson, M. and Raye, C. (1981), "Reality monitoring." *Psychological Bulletin*, 88, 67-85). (3) The SCAN training program (Sapir, A. (1987), *The LSI Course on Scientific Content Analysis* (SCAN) Phoenix, Ariz. Also, *SCAN workshop handbook* (2003) claims that certain linguistic and textual features of a document can be used to indicate likelihood of deception. Other approaches incorporate some features of these three, e.g., Buller, D. B. and Burgoon, J. K. (1996), "Interpersonal deception theory." *Communication Theory*, 6, 203-242; Wiener, M., and Mehrabian, A. (1968), *Language within Language: Immediacy, a Channel in Verbal Communication*, Appleton-Century-Crofts, N.Y.; but they have not had any direct influence on the present analysis for DI tagging. A detailed description of the Statement Validity Analysis and Reality Monitoring is given in Miller, G. and Stiff, J. (1993), *Deceptive Communication*. Sage, Newbury Park, Calif.); Vrij, A. (2001), *Detecting Lies and Deceit*, Wiley, N.Y.; and Porter, S. and Yuille, J. (1996), "The language of deceit: An investigation of the verbal clues to deception in the interrogation context." *Law and Human Behavior*, 20(4), 443-457. Shuy, R. (1998), The Language of Confession, Interrogation, and Deception, Sage, Newbury Park, Calif. and Zhou, L., Burgoon, J. Nunamaker, J. and Twitchell, D. P. (2004), "Automating linguistics-based cues for detecting deception in text-based asynchronous computer-mediated communication: An empirical investigation," *Group Decision and Negotiation*, (13)1, 81-106, provide an informative review of these two approaches and SCAN.

The DI tags used in the present system and method are motivated by descriptions in the literature cited above and from corpus analyses. In adapting indicators from the existing literature, the system includes a number of extensions and modifications in order to construct formal descriptions that would allow the indicators to be implemented in an automated system. Previous descriptions of deception indicators are, for the most part, informal and too dependent on the intuitions and skills of a human analyst to be suitable for rigorous implementation. The rules listed below in "DI Lexicon and Rules", by contrast, are formal descriptions that are implemented in the software components of the present system.

In addition, previous descriptions have not been targeted at mid-size (>100,000 words) to large corpora (>1,000,000 words) consisting of "real world" data. Experimental studies of deception indicators tend to focus on laboratory data rather than real world situations. Systems such as SCAN focus on data obtained through police investigation but lack rigorous empirical testing.

B. DI Lexicon and Rules

In one embodiment of the system and method according to the present invention, twelve linguistically defined DI Tags make up the DI tag inventory. Lexical DI's are taken directly from the Lexicon. Context sensitive DI's and DI phrases that contain optional material are identified by rules.

1. HDG (Hedge) indicates inexactitude, uncertainty and lack of commitment to the proposition.

Examples of Lexical HDG
a little bit
approximately
at one time
I assume
my impression
probably
sort of
to the best of my knowledge
whatever

| Examples of Context-sensitive HDG | |
|---|---|
| About | when followed by a numerical quantity or time expression |
| Between | when followed by a numerical quantity or time expression |
| specifically | when preceded by a negative |
| About | when followed by a numerical quantity or time expression |
| something, somebody | when not modified by a following phrase |
| stuff | when preceded by a zero or indefinite determiner |
| perception words (glance, glimpse, notice, etc.) | when not preceded by a negative (I just got a glance, I noticed) |

Additional lexical and context sensitive hedges can be implemented in the lexicon by including words and contexts in the following categories:

Non-factive verbs:
think, believe, assume, recall, seem, etc.
When followed by a clause, these verbs do not assign a truth value to the proposition expressed by the clause. For example, I believe the world is round does not presuppose that the world is round and so the clause the world is round may or may not be true. With a factive verb such as regret, e.g., I regret the world is round, the clause is presupposed to be true. Hence non-factive verbs provide a means for avoiding commitment to the truth of a proposition.

Non-factive nouns:
understanding, recollection, perception, assumption, etc.

Epistemic Adjectives and Adverbs
possible, various, approximately, repeatedly, etc.
These modifiers describe the speaker's opinion rather than an attribute (e.g., blue, unique, twice) of a noun or verb.

Perception verbs:
glimpse, notice, glance, etc.
These are hedges when they are not preceded by a negative (did not notice is not a hedge).

Indefinite Noun Phrases:
stuff, a guy, people, things, etc.
These nouns are hedges when they are preceded by a null or indefinite determiner (a, some)

2. ML (Memory Loss) indicates references to failed memory. ML's must contain an explicit reference to memory (e.g., recall, remember, forget). Most ML's have a variable form. For example, the following ML's may have an optional modifier that is denoted by the material in parentheses:
I (Adverb) can't recall
I (Adverb) don't recall
I (Adverb) can't remember
I (Adverb) don't remember
I have no (Adjective) recollection.
Adverb=really, just, simply,
Adjective=clear, real, 3. NE (Negative Emotion) words indicating negative emotions reported by the speaker)
a nervous wreck
angry
anxious
depressed
depression
felt threatened
grief
heartbroken 4. NF (Negative Form) demonstrated by a negative word (no, not, never) or morpheme (in, mis, un)
ain't
can't
impossible
never
nobody
not
uncomfortable
inadequate
wasn't
couldn't
Only one context sensitive rule applies to NF's: In double negatives where the negation is expressed by a negative word and not a morpheme (e.g., I don't know nothing about it vs. I was not uncomfortable) the first negative receives the NF tag, the second negative does not. All other NF's are lexically determined.

5. NPC (Noun Phrase Change): Indicates a change in the form of a Noun Phrase without a change in referent. The second NP in each of the NP sets below demonstrates NPC.
the checkout girl . . . the cashier
my car . . . the car
a lady . . . the person
knife . . . the blade 6. OZS (Over-zealous Statements): Unusual emphasis on the truth of a statement.
absolutely not
I couldn't even estimate
Oh, God
to tell you the truth
as a matter offact
I don't have the slightest idea
honest to God
I swear
truthfully 7. PC (Pronoun Change): Indicates a change in subject pronoun usage such as substitution of We for I or omission of the subject. In the following sentence pairs, the subject pronouns are underlined. The subject of the second sentence demonstrates a PC.
We went home. ___ ate lunch.
I concentrated on him We were kind of struggling 8. QA (Questionable Action): The sentence describes an action but it is unclear whether the action has been performed.

QA's are context sensitive tags. Most consist of a verb such as start followed by an infinitival complement (to plus a verb). The speaker must be the understood subject of the infinitive for the expression to be tagged as a QA. The verbs that can appear in a QA tag are listed in the lexicon as QA verbs with specified complement structures. Optional adverbial modifiers are allowed between the QA verb and its complement. Examples of QA verbs and complements:
ask I then asked for someone to bring me back.
attempt I attempted to open the door
go The children went out to feed the ponies
mean I think what I meant to say was
start I started to go The head of a QA may also be an adjective followed by an infinitival complement:
ready I was ready to go down that ramp QA's do not contain wh-words (who, what, where, . . . ). A wh-word in the complement will block QA assignment in sentences such as I don't recall what I asked them to do.

9. QUAL (Qualification): The speaker is providing a rationalization for past actions. A QUAL expression can justify actions that could be viewed as questionable or provide a defense of actions. Examples are:
   I was unfamiliar with the road and turned right instead of left
   We stayed around all evening because Don was expecting Donna
   I grabbed the knife thinking he was in the garage QUAL also provides the speaker with a method of diminishing the importance of an act or object involved with past actions:
   That was a very minor consideration in my forecasts.
   I was merely reporting what was happening.

10. TL (Time Loss): Refers to a gap in time rather than a sequence of specific, relatively continuous events over some period of time. TL's usually occur with non-specific time expressions. Examples are:
at one point
until
while
proceeded
departed 11. TRC (Thematic Role Change): Indicates a change in voice of the verb, usually active vs. passive. In the active/passive pairs below, the verb in each sentence is underlined. The verb in the second sentence demonstrates TRC. Examples are:
He had been moved out of the cell. I was talking to him.
That backpack was mine. That radio was found in the backpack.
I left as quickly as I could. The remaining two hours were spent trying to finish my workload 12. VTC (Verb Tense Change): Indicates a change in the tense of the main verb of the sentence. In the following examples, the main verbs are underlined. The main verb in the second sentence of each set demonstrates a VTC.
We heard the alarm go off on the car. My friend goes straight.
And then I find the backpack I started walking around.
Other DI tags may also be designed for use in the system according to the present invention as would be obvious to those of ordinary skill in the art.

C. DI Tag Summary

Testing to date shows that in the texts examined HDG and NF are the most frequently occurring DI tags. However, all DI tags can assist in deception detection in various texts. However, to become useful the DI tags are embodied in software components that are used to process the text that has been prepared by the preprocessor 132, POS tagger 134, and syntactic chunk parsers 138. These components are configured to read the text prepared and apply DI tag criteria that examine individual word chunks and their context in processed text with its POS labels and designated word chunks. The resources used by the DI Analyzer include a DI Analyzer Lexicon 180 and associated DI Analyzer 190 text rules.

To the extent particular DI tags are over time shown to have greater detection value than others, or to have particular correlations among each other that more strongly suggest deception, weights may be assigned to reflect this greater importance and/or correlation measures based on conventional statistics can be calculated and associated with analyzed text. The weights and the correlation measures may then become parameters for tuning the system for particular texts types or situations. The parameters may be employed in the density and distribution metrics for interpretation discussed below.

D. DI Analyzer Lexicon

A DI Lexicon 180 (FIG. 1) for use in the system according to the present invention contains a subset of all words of the language of the text to be analyzed. Each lexical entry consists of the word or phrase (word chunk), the DI tag identification and, optionally, a context sensitive condition for DI tag assignment. In addition, for single words, the lexical entry also specifies a part of speech.

Examples of simple lexical DI Tag entries:
   possible, Adjective, HDG
   unfamiliar, Adjective, NF
   I swear to God, OZS Examples of variable form tag entries, (--) marks optional items:
   I (Adverb) don't recall, ML
   (Adverb) scared, Adjective, NE
   to be (Adverb) honest, OZS Context Sensitive lexical entries include rules that direct the DI Analyzer 138 to examine local context (adjacent words) before assigning a DI tag. These are similar to subcategorization frames in linguistic description. They are highly lexically dependent. Each rule states that for a word W, when W is the ith word in a text, W receives a DI tag if either Wi−n or Wi+n meets the specified condition. The following table specifies two examples:

| Word | POS | DI Tag | Condition (Rule) | Interpretation |
|---|---|---|---|---|
| around | Adverb | HDG | Wi + 1 = NUM | around plus a following numerical expression is tagged as HDG |
| started | Vpast | QA | Wi + 2 = to Verb, Wi + 3 = NP to Verb | started plus an infinitival complement is tagged as QA |

A document is marked up in ASCII text format. The tagged words are enclosed in braces { }. A tag begins with an open-brace character '{', the end of a tag has a % symbol followed by the initials of the tag followed by the close-brace character '}'. Nesting of tags is allowed. For example, the NF tag {don't % NF} in {I {don't % NF}believe % HDG} is nested within the HDG tag.

E. DI Text Rules

PC (Pronoun Change), NPC, VTC, TRC, and QUAL tags depend on linguistic features of the text that may not be present in local context. These rules apply to the entire text analyzed or at least a substantial portion beyond the immediate local context of a word chunk.

PC:

PRO1, . . . , PROn is a sequence of all [word/PRP]Subject_NP tags in the text for each PRO in the ith position, if PROi!=PROi+1, then tag PROi+1 as a PC (Where !=means not equal.)

(Find a pronoun in the text and then see whether it is changed in the next following usage for the same referent.)

NPC:

R1, . . . , Rn is a set of referents in the text, NP1, . . . , NPn is a sequence of NP's where each NP has a referent R(NP).

for each NP in the ith position, if R(NP)i=R(NP)i+1 and NPi!=NPi+1, then tag NPi+1 as NPC (Identify a set of references for the text, based on first occurrence of a NP, e.g. "my car".

Match references and subsequent NP's, e.g., "the vehicle". If two NPs have the same referent but different forms, mark the second NP with the NPC tag.)

VTC:

VB1, . . . , VBn is a sequence of MainVerb tags in the text, where the POS tag is either VPAST or VPRES for each VB in the ith position, if VBi!=VBi+1, then tag VBi+1 as a VTC (Look for a verb. Assume the Penn Treebank tagset found in Marcus, M. P., Santorini, B. and Marcinkiewicz, M. A. (1993) "Building a large annotated corpus of English: The Penn Treebank," *Computational Linguistics,* 19(2), 313-330. VBD is VPAST, VBP and VBZ are VPRES. If the current Main Verb is VPAST, then the next VPRES verb will receive the VTC tag. If the current Main Verb is VPRES, then the next VPAST verb will receive the VTC tag.)

TRC:

A. Active/Passive TRC $VB_1, \ldots, VB_n$ is a sequence of MainVerb tags in the text for each VB in the ith position, if $VB_i$ contains VBN and $VB_{i+1}$ does not contain VBN, then tag $VB_{i+1}$ as TRC if $VB_i$ does not contain VBN and $VB_{i+1}$ contains VBN, then tag $VB_{i+1}$ as TRC B. NP Agent TRC NP1, . . . , NPn is a sequence of NPs in the text, where each NP has a thematic role TR(NP) assigned by a MainVerb.

for each NP in the ith position, if NPi=NPi+1 and TR(NPi)!=TR(NPi+1), then tag NPi+1 as TRC.

(Use syntactic/semantic analysis to get the thematic role for each NP in the text. Thematic role can be determined for a NP if (i) the NP has a grammatical relationship with the verb—subject, object—and (ii) the verb is marked in the lexicon for the thematic roles it assigns. For example, in "I sent a letter" and "I received a letter", "I" is subject of the verb but "send" marks its subject as an agent and "receive" marks its subject as a patient recipient of the action.)

QUAL

Identify the speaker in the text as the actor. Look for causal or explanatory words and phrases as identified in the lexicon; use context analysis to determine if causal or explanatory words and phrases are rationalizations offered by the speaker/actor, rather than factual statements of cause.

Assign a QUAL tag if:

The sentence contains causal and explanatory words and phrases—because, in order to, since, but—that are both preceded and followed by a declarative sentence that describes an action:

We were there by the car looking because you can see the alarm going off The sentence identifies personal attributes of the speaker that can be used to rationalize an action:

I tire easily.

I have asthma that is triggered by smoke.

I can see clearly.

In addition to the exemplary types of DI tags described above, other types of DI tags may be designed and implemented in accordance with the system and method of the present invention as would be apparent to those of skill in the art.

IV. The Interpreter

A. Scoring and Display of a Tagged Document.

Once the DI tags are placed in a text, the most basic form of deception likelihood data is available for an observer who reviews the text. However, the presence of DI tags in a statement is not in itself sufficient to determine whether the language of the statement is deceptive. Many DI tags, e.g., hedges and negative forms, are common in non-deceptive language. Hence once the DI Analyzer 138 has assigned DI tags to the text, it remains for Interpreter 140 to interpret the distribution and/or density of DI's in order to determine the likelihood that a particular proposition or set of propositions in the statement is deceptive.

In one embodiment in accordance with the present invention, deception likelihood is calculated in two steps. First, the tag proximity metric measures the distance between each word in a text and the nearest DI tag. Second, the moving average metric assigns a user-defined value to the distance measure. Each of these metrics is a potentially useful form of deception likelihood data and may assist a text reader in identifying portions of the text that merit study for possible deception.

The system allows for the parsing of a question/answer formatted discussion such that only the text of the answer is recognized for purposes of distance and moving average calculations. For example, in a text having a question and answer format, only text entered in answer fields may be analyzed. Similarly, other types of texts may be selectively analyzed, for example, by selecting certain text fields, selecting specific text to be analyzed, for example, using a computer mouse, or other means of selectively identifying portions of text to be analyzed.

Once a moving average is assigned, the Interpreter 140 displays the results according to a range of settings that can be specified in a configuration file 192 (see FIG. 1) or other system component.

B. Calculate Tag Proximity Metric

The proximity metric calculates a tag proximity score for each word in the text. The score comes from counting the number of words between the current word and the nearest DI tag. The nearest DI tag may precede or follow the current word. Hence the metric looks to the left and to the right of the current word, counts the words to the preceding and following DI tags, and selects the lesser number as the tag proximity value. A lower number indicates a close proximity or higher density of DI tags. A higher number indicates less proximity or lower density of DI tags. The metric uses a counter whose initial value is set at 0. If the current word $W_i$ is contained in a word chunk marked with a DI tag, the metric terminates and the counter does not advance. In this case the tag proximity score is 0. If $W_i$ is not contained within a word chunk marked with a DI tag, the counter advances in increments of 1 for each word to the left and for each word to the right until a word chunk marked with a DI tag or document boundary is encountered. (A document boundary is the beginning or end of the document.) Should a document boundary be encountered, the count for that side will be disregarded. The metric thus produces two scores: Wp, Wp−1, . . . , Wp−k is the distance to a preceding DI tag, Wf, Wf+1, . . . , Wf+m is the distance to the following DI tag. The tag proximity score for a word chunk utilizes whichever is the lesser value, k or m. (A sum or average of the two scores might also be used as a metric.)

C. Calculate Moving Averages

The moving average metric is based on a user-defined number N (specified, e.g., in configuration file 192). Where N is odd, the Interpreter 140 sums the proximity scores for ((N−1)/2) word chunks to the left of the current word and ((N−1)/2) word chunks to the right of the current word, then divides the sum by N. Where N is even, the Interpreter 140 sums the proximity scores for (N/2) word chunks to the left of the current word and ((N−2)/2) word chunks to the right of the current word, then divides the sum by N. Only word chunks with an initial proximity score greater than 0 can be counted. The result is a new proximity score for each word in the text.

If calculating revised proximity scores at or near document boundaries, the sum may include as many word chunks to the left or right of the current word as possible, until the document terminus is reached. The calculation using the average (N) may be revised to reflect the count of word chunks included in the span. Finally, a document-level average may also be calculated, by summing proximity scores for all word chunks and dividing by the total number of words. Averages for specific portions of a text file may also be similarly calculated.

The user interface may provide an option to set a moving average and so to recalculate proximity scores for each word. This allows for a more meaningful setting of the threshold scores for later analysis and display by allowing isolated tags to be de-weighted (low proximity or DI tag density) and larger clusters of tags to have greater significance.

Other frequency, density or distribution metrics for quantifying frequency of occurrence, density or distribution of DI tags may also be used. For example, actual words instead of word chunks might be counted. Or the density of certain single DI tag types (e.g., density of HDG tags alone or NF tags alone) or of DI tags representing a subset of the full set of DI tags (e.g., density of just HDG, NF and MLS tags or a correlated group of tags) might be calculated or shown graphically, based on positions in the displayed text.

The process performed by Interpreter 140 in accordance with the present invention will now be described with reference to the following example.

A sample text to be analyzed is provided as follows. Each letter A-Z represents a word received from parser 136. DI tags $DI_1$-$DI_5$ have been added by DI Analyzer 138. While the tagged portions of the sample text shown include a single word, DI tags can be associated with multiple consecutive words in a text, such that each word grouped within a DI tag would have a proximity metric of zero.

Sample Text:

| A | B | C | D | E | $[DI_1]$ F | G | H | I |
| J | K | $[DI_2]$L | $[DI_3]$M | N | O | P | Q | R |
| $[DI_4]$S | T | U | V | W | X | $[DI_5]$Y | Z | |

| Word | Score | Pos | LftWndPos | RightWndPos | MovingAvg | Window Size |
|---|---|---|---|---|---|---|
| A | 5 | 0 | 0 | 7 | 2.25 | 7 |
| B | 4 | 1 | 0 | 7 | 2.25 | 7 |
| C | 3 | 2 | 0 | 7 | 2.25 | 7 |
| D | 2 | 3 | 0 | 7 | 2.25 | 7 |
| E | 1 | 4 | 0 | 7 | 2.25 | 7 |
| F $[DT_1]$ | 0 | 5 | 1 | 8 | 2 | 7 |
| G | 1 | 6 | 2 | 9 | 1.75 | 7 |
| H | 2 | 7 | 3 | 10 | 1.5 | 7 |
| I | 3 | 8 | 4 | 11 | 1.25 | 7 |
| J | 2 | 9 | 5 | 12 | 1.125 | 7 |
| K | 1 | 10 | 6 | 13 | 1.25 | 7 |
| L $[DI_2]$ | 0 | 11 | 7 | 14 | 1.375 | 7 |
| M $[DI_3]$ | 0 | 12 | 8 | 15 | 1.5 | 7 |
| N | 1 | 13 | 9 | 16 | 1.375 | 7 |
| O | 2 | 14 | 10 | 17 | 1.25 | 7 |
| P | 3 | 15 | 11 | 18 | 1.125 | 7 |
| Q | 2 | 16 | 12 | 19 | 1.25 | 7 |
| R | 1 | 17 | 13 | 20 | 1.5 | 7 |
| S $[DI_4]$ | 0 | 18 | 14 | 21 | 1.75 | 7 |
| T | 1 | 19 | 15 | 22 | 1.75 | 7 |
| U | 2 | 20 | 16 | 23 | 1.5 | 7 |
| V | 3 | 21 | 17 | 24 | 1.25 | 7 |
| W | 2 | 22 | 18 | 25 | 1.25 | 7 |
| X | 1 | 23 | 19 | 25 | 1.42857143 | 6 |
| Y $[DI_5]$ | 0 | 24 | 20 | 25 | 1.5 | 5 |
| Z | 1 | 25 | 21 | 25 | 1.4 | 4 |

Moving Average $\boxed{N=8}$
Word is the word from the document (A, B, C, etc.)
Score is the distance (word count) to the nearest DI tag
Pos is the numeric index of that word (A = 0, B = 1, etc)
LeftWndPos is the left index of the moving average window
RightWndPos is the right index of the moving average window
MovingAvg is the average of the values within that window
Each WndPos value is capped by start/end of document From the user interface, a user may modify the Moving Average window value (N) to see the averages for different window sizes.

In the example provided above, the following Microsoft® Excel® formulae are used to calculate the values in the chart:

The values for "Word," "Score," and "Pos" fields may be entered manually for a given text. The chart above then uses the following formulae:

LftWndPos=MAX(0,Pos−ROUNDDOWN($N/2$,0))
where $N$ is the $MA$ window.

RightWndPos=MIN(25,LftWndPos+$N$−1) where $N$ is the $MA$ window.

MovingAvg=AVERAGE(OFFSET
($\text{Score}_{FirstWord\ in\ Text}$:$\text{Score}_{SecondWordinText}$,
LftWndPos, 0, RightWndPos−LftWndPos+1,1)).

In this example, N is the MA Window value 8, $\text{Score}_{FirstWord\ in\ Text}$ is the Score of the first word A in the sample text, i.e., 5, and $\text{Score}_{SecondWordinText}$ is the Score of the last word Z in the sample text, i.e., 1.

In a preferred embodiment of the present invention, the value of the MA window N is defined as selectable within the range of 8 to 28. This value defines the word width of a moving window of evaluation that progresses through the text of interest and within which the moving average is computed.

For example, in the sample text below, the window of evaluation (where N=8) for word F may be illustrated as the shaded region:

```
A    B    C    D    E    [DI1]F G   H    I
J    K    [DI2]L [DI3]MN  O    P    Q    R
[DI4]S T    U    V    W    X    [DI5]Y Z
```

Similarly, the window of evaluation for the word G may be illustrated as the shaded region:

```
A    B    C    D    E    [DI1]F G   H    I
J    K    [DI2]L [DI3]MN  O    P    Q    R
[DI4]S T    U    V    W    X    [DI5]Y Z
```

Similarly, the window of evaluation for the word H may be illustrated as the shaded region:

```
A    B    C    D    E    [DI1]F G   H    I
J    K    [DI2]L [DI3]MN  O    P    Q    R
[DI4]S T    U    V    W    X    [DI5]Y Z
```

The window of evaluation for each word in the text may be similarly identified. Thus, as the moving average for each word in the text is computed, the window of words considered in the evaluation progresses through the text.

In calculating the moving averages for words within a text, corpus analyses show that if the value of N is substantially less than the lowest value in the range, the portions of the text that will be highlighted by the Interpreter 140 (see display description in section E below) as potentially deceptive may include only the DI tagged words and therefore may be less helpful to the user. If the value of N is substantially greater than the highest value in the range, the Interpreter 140 may highlight large chunks of text as potentially deceptive that may be overly inclusive and therefore less helpful to the user. The suggested range of N values from 8 to 28 allows for a balance between too much and too little highlighted potentially deceptive text. The N value may be adjusted by or for the user accordingly.

As discussed above, DI tags can be associated with one word or multiple consecutive words in a text. In cases where DI tags are associated with multiple consecutive words in the text, each word grouped within a DI tag is assigned a proximity metric of zero. In calculating the moving average for the words in the text surrounding the tagged words, several approaches are possible. One approach is to count each word within the DI tag as a word. Another approach is to count all of the words within the DI tag as one single word with a zero proximity value. In situations in which the number of words within a single DI tag is large, for example 10 or more, it may be preferable to count all of the words within the tag as one word with a zero value when calculating the moving average for the surrounding text to avoid giving undue weight to the contents of the DI tag in the deception analysis. For example, a DI tag including a phrase with 15 words may not be more indicative of potential deception than a DI tag including a phrase of 3 words. However, if each of the words in a DI tag (each having a zero proximity value) is used to calculate the moving averages of the surrounding words, more surrounding text will be found potentially deceptive when the DI tag contains 15 words in comparison to the DI tag with 3 words. Thus, it may be helpful to consider all words within the DI tags as a single word with a zero proximity value when calculating the moving averages of surrounding words to more equally weigh the DI tags in the interpretation process.

D. Categorize by Breakpoints

The Interpreter 140 uses the revised density scores (obtained from the moving average calculator) to identify areas of a text that are likely or unlikely to be deceptive. Breakpoints provide a scaling for the analysis and display of text with the revised proximity scores. That is, the breakpoints are used to define categories representing the highest density or frequency of distribution of DI tags as measured with a given window size and categories representing one or more lower densities or frequencies of distribution. Labeling words as belonging to the category representing the highest density or frequency of distribution of DI tags thus flags these words as of the greatest interest to a reader trying to identify deception within the text and seeking a useful display of deception likelihood data.

Each word chunk has a moving average score as described above attached to it as one measure of deception likelihood data. A system of establishing breakpoints is applied based on the scores. The breakpoints define proximity score ranges that can be set by a system developer or user within a configuration file or other system component. In one implementation, breakpoint values are set in a configuration file. Exceeding a certain breakpoint has the impact of changing the display format of a given word chunk. In one embodiment of the present invention, implementation allows for up to 5 distinct inter-breakpoint regions. For example, the following breakpoint regions could be defined:

| Breakpoint Level | Region Range (Moving Av.) |
| --- | --- |
| Level 1 | 0-1.99 |
| Level 2 | 2.-3.99 |
| Level 3 | 4-5.99 |
| Level 4 | 6-10 |
| Level 5 | above 10 |

Referring to the example above showing deception likelihood data developed using an Excel® spreadsheet to compute a moving average, it can be said that words G through Z would fall within Level 1, while words A through F would fall within Level 2.

Some breakpoints can be set to identical values to yield the equivalent of fewer distinct regions. As illustrated by the example above, smaller values at the lower levels signify deception is more likely. Thus, the breakpoints may be defined to help identify levels of greater or lesser likelihood of deception within the deception likelihood data.

E. Display Marked Text

Text processed using the system and method according to the present invention to compute deception likelihood data for particular words within a text may be marked in any suitable format, for example, by highlighting words in different colors, different types of underlining, font differences or similar markings, based on a word's moving average score and the breakpoint settings. For example, all words with scores of 0-1.99 may be highlighted with red; all words with scores of 2-3.99 may be highlighted with orange; all words with scores of 4-5.99 may be highlighted with yellow; all words with scores of 6-9.99 may have no highlighting; all words with scores of above 10 would be highlighted with green.

In accordance with an alternative embodiment, only two colors are displayed: text having a moving average of 2.1 or less is highlighted in red, and text having a moving average of more than 10 is highlighted in green. In this embodiment, the user sees the red text as potentially deceptive (deception likelihood data for that text indicates a high likelihood of deception) and the green text as likely to be true (deception likelihood data for that text indicates a low likelihood of deception). The remainder of the text is not highlighted.

Otherwise, the text may be displayed with the original format preserved (i.e., line breaks, punctuation, case, indents, line and page numbers). The display uses the information stored in the data structures generated by the various processing steps applied to the text. FIG. 3 shows a simplified sample display with underlining used to mark words at three different levels. No words are marked for Levels 4 and 5. (The sample is not based on a real density metric calculation, which would need to include adjacent text before and/or after the text shown to provide a basis for true calculation of the metrics discussed above).

Other views of or display formats for the deception likelihood data (e.g., DI tags, proximity metrics, moving averages, and/or breakpoint levels associated with words in a text), are also possible. If one or more specific DI tags are viewed as most significant, an alternate display could be limited to a scoring and averaging result that takes into consideration only the instances and density of selected DI tags.

Figure 4:
FIG. 4 is a diagram showing an alternative for how text is marked for display after analysis for deception.

In another embodiment, the text displayed could include some or all of the labels derived from processing that is used to arrive at the text output by the DI analyzer 138. For example, as shown in FIG. 4, the DI tags or a label corresponding might be embedded or included parenthetically in a text. This could permit a reviewer to study the displayed text with knowledge that the speaker had employed a hedge (HDG) or professed memory loss (ML) that might or might not be genuine or that a particular word was an NF (negative form) indicator. This may add useful meaning to the computed deception likelihood data based on density or frequency of distribution of the DI tags.

F. Method Flow Chart

Figure 2:
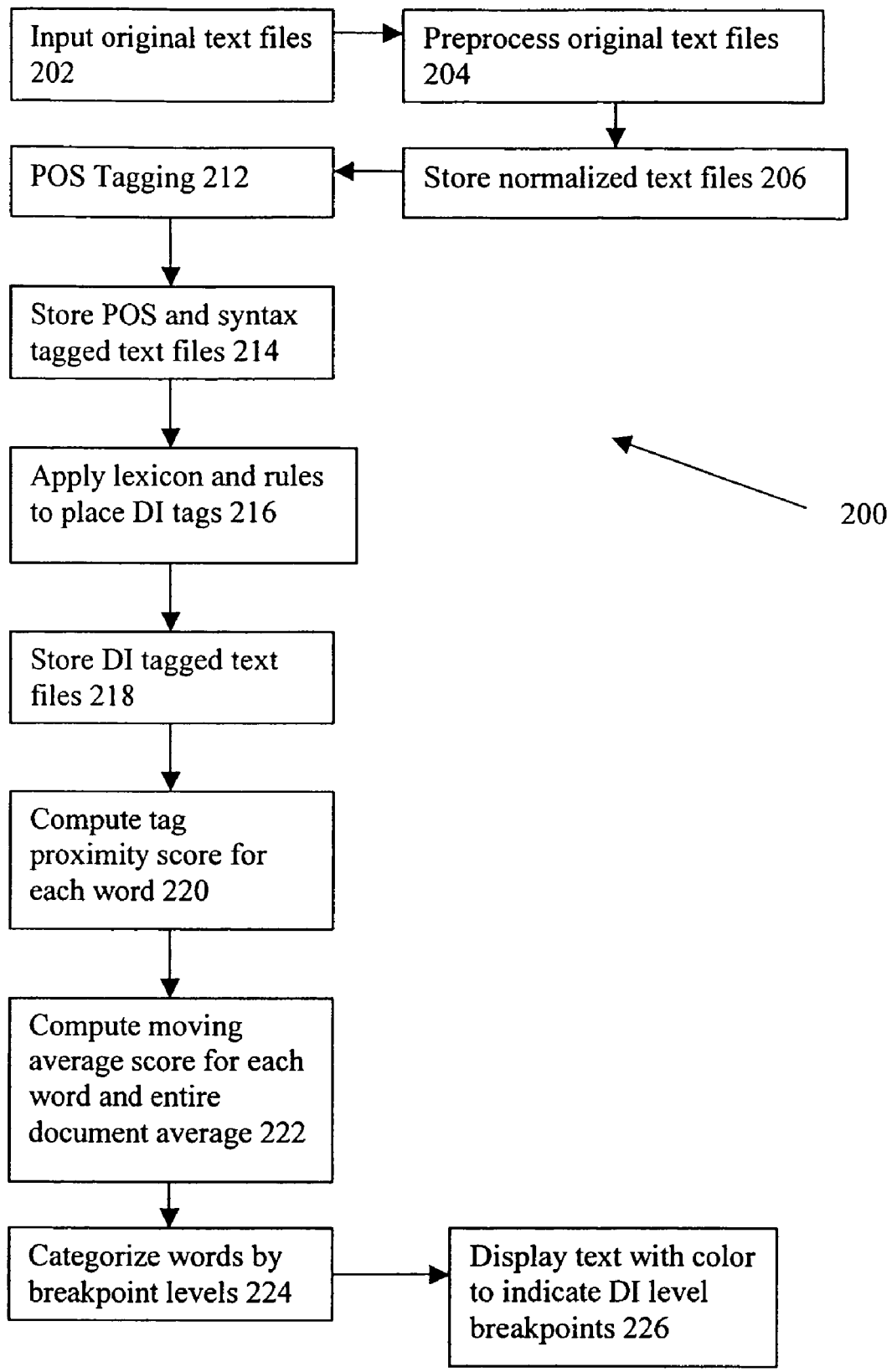
FIG. 2 is a flowchart showing the overall processing of text in one embodiment of the invention.

With reference to FIG. 2, a method 200 in accordance with the present invention begins with inputting of the original text files to be analyzed 202. This is followed by preprocessing the original text files 204 and storing the resulting, normalized text files 206. Next follows POS tagging of the normalized text files 212 and storing of the POS and syntax-tagged text files that result 214. After this, the system applies the DI lexicon and associated context sensitive rules to place DI tags for the various DI types 216. The DI tagged text files are stored 218 to set up the interpretive computations. First, the system computes a tag proximity score for each word chunk 220 and then computes a window-based moving average proximity score for each word or word chunk using a moving window of evaluation (as described in detail in the example given above) and an average for the entire statement (document) being analyzed 222. Once the deception likelihood data is available, the system categorizes the words according to the defined breakpoint levels 224. Finally, the text is labeled with color (or other indicia) designating words according to the DI level breakpoints 226. This permits the user to locate textual areas that have a higher density of DI tags. The files generated by these various steps are stored in data structures that preserve the processing results.

Although the present invention has been described with reference to preferred embodiments, persons skilled in the art will recognize that changes may be made in form and detail without departing from the spirit and scope of the invention.

What is claimed is:

1. A system for identifying deception within a text, comprising:

a processor for storing and processing a text file containing statements from a particular person whose credibility is being weighed as to verifiable propositions included in the text; and a memory;

a deception indicator tag analyzer stored in memory and executing on the processor for inserting into the stored text file at least one deception indicator tag that identifies a potentially deceptive word or phrase at its location within the text file, and an interpreter stored in memory and executing on the processor for (a) interpreting the at least one deception indicator tag to determine a distribution of potentially deceptive words or phrases within the text file and for computing and storing for user review deception likelihood data based upon the distribution of potentially deceptive words or phrases within the text file, said deception likelihood data including a calculated distribution proximity metric for a plurality of words or phrases in the text file based upon the proximity of a word or phrase to the at least one deception indicator tag; and (b) marking words in the text file with differentiating indicia showing the proximity level calculated, to identify areas of the text file more likely to involve deception.

2. A system according to claim 1, wherein the interpreter inserts in the text file the calculated proximity metric for each word or phrase to identify areas of the text file that are likely or unlikely to be deceptive.

3. A system for identifying deception within a text, comprising:

a processor for storing and processing a text file containing statements from a particular person whose credibility is being weighed as to verifiable propositions included in the text; and a memory;

a deception indicator tag analyzer stored in memory and executing on the processor for inserting into the stored text file at least one deception indicator tag that identifies a potentially deceptive word or phrase at its location within the text file, and an interpreter stored in memory and executing on the processor for interpreting the at least one deception indicator tag to determine a distribution of potentially deceptive words or phrases within the text file and for computing and storing for user review deception likelihood data based upon the distribution of potentially deceptive words or phrases within the text file, said deception likelihood data including a calculated distribution proximity metric for a plurality of words or phrases in the text file based upon the proximity of a word or phrase to the at least one deception indicator tag, the proximity metric comprising a moving average metric for the plurality of words and phrases in the text file based upon the proximity metric of the word or phrase, wherein the moving average metric comprises a portion of the deception likelihood data and said interpreter inserts in the text file the proximity metric for the plurality of words and phrases to identify areas of the text file that are likely or unlikely to be deceptive.

4. A system according to claim 3, further comprising a display communicating with the interpreter executing on a processor for displaying the deception likelihood data within the text and in association with the at least one deception indicator tag according to one or more levels of likely deception.

5. A system according to claim 3, wherein the processor further comprises
- a receiver executing on a processor for receiving a first text file to be analyzed;
- a component executing on a processor for normalizing the first text file to produce a normalized text;
- a component executing on a processor for inserting into the normalized text file at least one part-of-speech tag that identifies a part of speech of a word associated with the part-of-speech tag; and
- a component executing on a processor for inserting into the normalized text file at least one syntactic label that identifies a linguistic construction of one or more words associated with the syntactic label,
- wherein the normalized text file including the at least one part-of-speech tag and the at least one syntactic label is provided to the deception indicator tag analyzer.

6. A system according to claim 5, wherein the deception indicator tag analyzer executing on a processor inserts the deception indicator tag into the normalized text file based upon words or phrases in the normalized text, part-of-speech tags inserted into the normalized text file, and syntactic labels inserted in the normalized text file.

7. A system according to claim 6, wherein the deception indicator tags are associated with a defined word or phrase found in a text file.

8. A system according to claim 6, wherein the deception indicator tags are associated with a defined word or phrase when used in a defined linguistic context found in a text file.

9. A system according to claim 3, wherein the calculation of the moving average metric for each word or phrase in the text file may be adjusted by a user of the system to focus the deception likelihood data within a text window length as specified in a configuration file.

10. A system according to claim 3, wherein the moving average metric associated with each word or phrase within the text file is used to determine a level of potential deception likelihood for the associated word or phrase.

11. A method performed by a programmed processor for identifying deception within a text, comprising the steps of:
- receiving by the processor a first text to be analyzed containing statements from a particular person whose credibility is being weighed as to verifiable propositions included in the text;
- normalizing the first text by the processor to produce a normalized text;
- inserting into the normalized text by the processor at least one part-of-speech tag that identifies a part of speech of a word associated with the part-of-speech tag;
- inserting into the normalized text by the processor at least one syntactic label that identifies a linguistic construction of one or more words associated with the syntactic label;
- responsive to a deception tag analyzer that analyzes the normalized text and identifies potentially deceptive words and phrases, inserting into the normalized text by the processor at least one deception indicator tag that identifies a potentially deceptive word or phrase indicating a non-truthful statement at its location within the normalized text; and
- interpreting the at least one deception indicator tag by (a) generating, by the processor computing and storing for user review, deception likelihood data based upon the distribution of potentially deceptive words or phrases within the normalized text, said deception likelihood data including a calculated distribution proximity metric for a plurality of words or phrases in the text file based upon the proximity of a word or phrase to the at least one deception indicator tag, and (b) marking words in the text file with differentiating indicia showing the proximity level calculated, to identify areas of the text file more likely to involve deception.

12. A method according to claim 11, wherein the step of interpreting the at least one deception indicator tag comprises the step of:
- inserting in the text the calculated proximity metric for each word or phrase in the text to identify areas of the text file that are likely or unlikely to be deceptive.

13. A method performed by a programmed processor for identifying deception within a text, comprising the steps of:
- receiving by the processor a first text to be analyzed containing statements from a particular person whose credibility is being weighed as to verifiable propositions included in the text;
- normalizing the first text by the processor to produce a normalized text;
- inserting into the normalized text by the processor at least one part-of-speech tag that identifies a part of speech of a word associated with the part-of-speech tag;
- inserting into the normalized text by the processor at least one syntactic label that identifies a linguistic construction of one or more words associated with the syntactic label;
- responsive to a deception tag analyzer that analyzes the normalized text and identifies potentially deceptive words and phrases, inserting into the normalized text by the processor at least one deception indicator tag that identifies a potentially deceptive word or phrase indicating a non-truthful statement at its location within the normalized text; and
- interpreting the at least one deception indicator tag by generating, by the processor computing and storing for user review, deception likelihood data based upon the distribution of potentially deceptive words or phrases within the normalized text, said deception likelihood data including a calculated distribution proximity metric for a plurality of words or phrases in the text file based upon the proximity of a word or phrase to the at least one deception indicator tag, wherein the step of interpreting the at least one deception indicator tag further comprises the steps of:
- calculating a moving average metric for the plurality of words or phrases in the text file based upon the proximity metric of the word or phrase, wherein the moving average metric comprises a portion of the deception likelihood data and inserting in the text the calculated proximity metric for the plurality of words or phrases in the text to identify areas of the text file that are likely or unlikely to be deceptive.

14. A method according to claim 13, further comprising the step of
- displaying the deception likelihood data within the text and in association with the at least one deception indicator tag according to one or more levels of likely deception.

15. A method according to claim 13, wherein the deception indicator tag analyzer inserts the deception indicator tag into the normalized text based upon words or phrases in the normalized text, part-of-speech tags inserted into the normalized text, and syntactic labels inserted in the normalized text.

16. A method according to claim 15, wherein the deception indicator tags are associated with a defined word or phrase found in a text file.

17. A method according to claim 15, wherein the deception indicator tags are associated with a defined word or phrase when used in a defined linguistic context found in a text file.

18. A method according to claim 13, wherein the calculation of the moving average metric for each word or phrase in the text file may be adjusted by a user of the system to focus the deception likelihood data within a text window length as specified in a configuration file.

19. A method according to claim 13, wherein the moving average metric associated with each word or phrase within the text file is used to determine a level of potential deception likelihood for the associated word or phrase.

20. A method according to claim 13, wherein the step of receiving a first text to be analyzed comprises receiving a live feed from a real-time transcription of a person's utterances and the deception likelihood data is generated in real time.

21. An article of manufacture comprising:
   a computer readable non-transitory storage medium for identifying deception within a text containing statements from a particular person whose credibility is being weighed as to verifiable propositions included in the text, wherein the program code directs a computer to perform a method comprising the steps of:
   controlling a deception indicator tag analyzer for inserting into the text file at least one deception indicator tag that identifies a potentially deceptive word or phrase at its location within the text file, and
   controlling an interpreter for interpreting the at least one deception indicator tag to determine a distribution of potentially deceptive words or phrases within the text file and for computing and storing for user review deception likelihood data based upon the distribution of potentially deceptive words or phrases within the text file, said deception likelihood data including a calculated distribution proximity metric for a plurality of words or phrases in the text file based upon the proximity of a word or phrase to the at least one deception indicator tag, the proximity metric comprising a moving average metric for the plurality of words or phrases in the text file based upon the proximity metric of a word or phrase, wherein the moving average metric comprises a portion of the deception likelihood data and said interpreter inserts in the text file the proximity metric for the plurality of words or phrases to identify areas of the text file that are likely or unlikely to be deceptive.

22. An article of manufacture according to claim 21, further comprising program code for:
   receiving a first text to be analyzed;
   normalizing the first text to produce a normalized text;
   inserting into the normalized text at least one part-of-speech tag that identifies a part of speech of a word associated with the part-of-speech tag; and
   inserting into the normalized text at least one syntactic label that identifies a linguistic construction of one or more words associated with the syntactic label;
and wherein the program code for the deception indicator tag analyzer inserts into the normalized text at least one deception indicator tag that identifies a potentially deceptive word or phrase within the normalized text, and the program code for the interpreter interprets the at least one deception indicator tag to determine a distribution of potentially deceptive words or phrases within the normalized text and generates deception likelihood data based upon the distribution of potentially deceptive word or phrases within the normalized text.

* * * * *